(No Model.)
2 Sheets—Sheet 1.

W. F. BROWNE.
PROCESS OF AND APPARATUS FOR MAKING GAS.

No. 586,988. Patented July 27, 1897.

WITNESSES:
M. R. M. Frayser
Harry S. Rohrer

INVENTOR
William Frank Browne
BY E. B. Clark
ATTORNEY.

(No Model.) 2 Sheets—Sheet 2.

W. F. BROWNE.
PROCESS OF AND APPARATUS FOR MAKING GAS.

No. 586,988. Patented July 27, 1897.

WITNESSES:

INVENTOR
William Frank Browne
BY
E. B. Clark
ATTORNEY.

United States Patent Office.

WILLIAM FRANK BROWNE, OF NEW YORK, N. Y.

PROCESS OF AND APPARATUS FOR MAKING GAS.

SPECIFICATION forming part of Letters Patent No. 586,988, dated July 27, 1897.

Application filed April 30, 1896. Serial No. 589,770. (No model.)

*To all whom it may concern:*

Be it known that I, WILLIAM FRANK BROWNE, a citizen of the United States, residing at New York city, in the county and State of New York, have invented certain new and useful Improvements in Processes of and Apparatus for Making Heating and Illuminating Gas; and I do hereby declare the following to be a full, clear, and exact description of the invention, such as will enable others skilled in the art to which it appertains to make and use the same.

This invention relates to a continuous process of and apparatus for making heating and illuminating gas from a mixture or emulsion of water and hydrocarbon liquid or carbonaceous material in heated conduits or coils and a body of solid incandescent fuel.

The object of my invention is to provide for better decomposing and converting into fixed gas certain gaseous vapors from oil and water in a body of incandescent fuel, so as to produce a dry gas free from oxidizing agents and subsequently utilizing such gas in a highly-heated condition for heating the generating-coils, thereby preventing oxidation of the iron coils when heated to the high degree of heat required for decomposing the liquids and vapors passed through them.

A suitable apparatus for carrying out my process and embodying my invention is illustrated in the accompanying drawings, in which—

Figure 1:
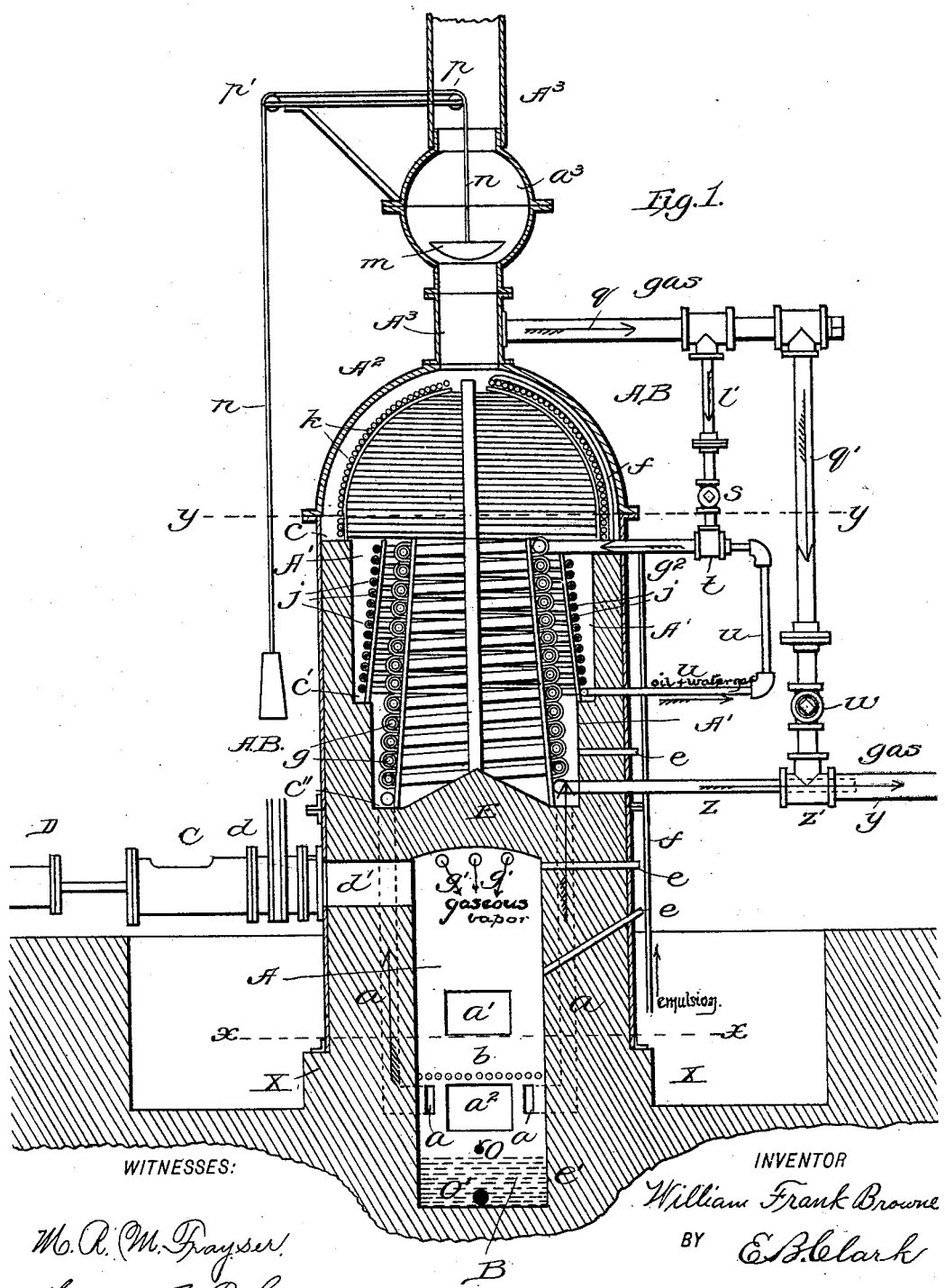
Figure 2:
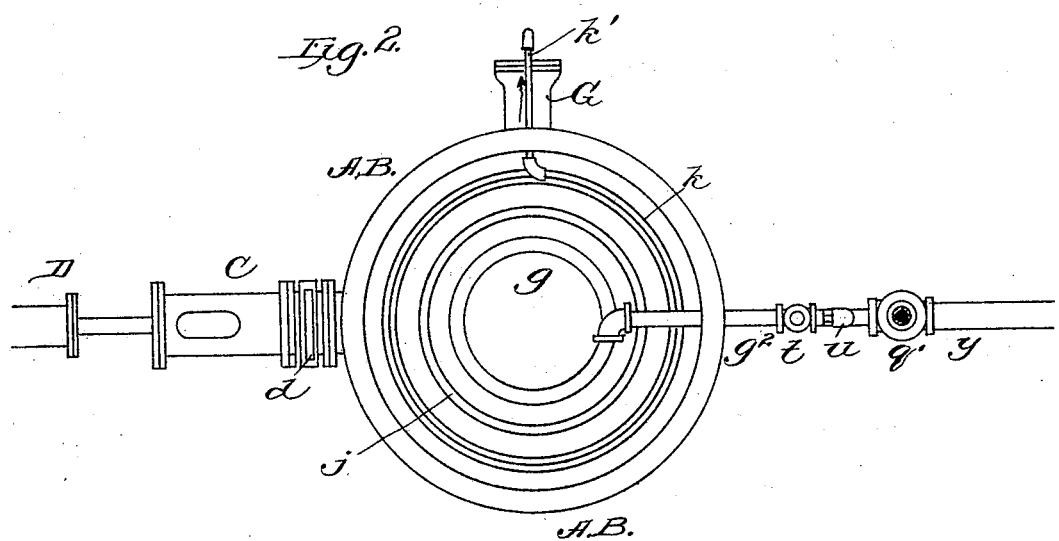
Figure 3:
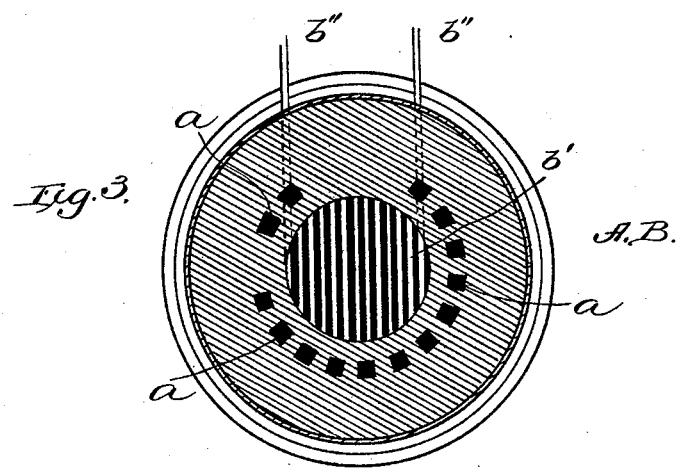

Figure 1 represents a vertical central section of the gas-generating apparatus with parts in side elevation. Fig. 2 represents a horizontal section on line $y\ y$. Fig. 3 represents a horizontal section on line $x\ x$.

The gas-generator A B is constructed of a tight iron jacket or shell and an interior brick lining resting upon a suitable foundation X. The interior of the generator is divided by the horizontal arch or partition E into the fuel-chamber A and the coil-chamber A'. The coil-chamber is closed at the top by an iron dome $A^2$, having a smoke-stack $A^3$. The fuel-chamber A is provided with a door $a'$ above the grate for the purpose of entering the furnace for repairs and for cleaning the grate and with a door $a^2$ for cleaning the ash-pit.

A series of vertical flues $a$ connect the coil-chamber A' with the base of the fuel-chamber A or with the ash-pit B just below the grate $b$ for conducting hot gases from chamber A up into contact with the generating-coils. The ash-pit B is preferably made to hold a supply of water $e'$, and is provided with an inlet water-pipe $o$ and an outlet-pipe $o'$, which pipes in practice will be provided with suitable seal-traps (not here shown) for preventing the escape of gas. The grate $b$ is preferably composed of hollow bars $b'$, suitably connected for the circulation of water. The extreme ends $b''\ b''$ of the hollow grate project through the walls of the furnace, as shown in Fig. 3, and are in practice connected to some circulating device, (not here shown,) such as a steam-boiler, for circulating water through the bars and thus preventing them from burning out.

A tight fuel-feeding device C D, having a gate-valve $d$, connects by the opening $d'$ with the top of fuel-chamber A for feeding fuel thereto after the escape of gas. The details of the construction of the fuel-feeding device are not herein shown, as they form no part of the present invention.

The interior of the coil-chamber A' is provided with suitable circumferential ledges or shoulders $c\ c'\ c''$, formed in the brickwork for supporting the different sets of coils $g, j$, and $k$. These generating-coils $g, j$, and $k$ are secured by suitable staples to iron supporting-bars for holding them in place. The upper coil $k$ is for the purpose of generating heating-gas for immediate combustion in the top of the fuel-chamber A. The coil is supplied, through pipe $f$, connecting at its upper end, with a suitable emulsion of hydrocarbon oil and water, which may be forced into it by an emulsion-pump. (Not here shown.) The emulsion enters the top of coil $k$, but in passing through the same will be converted into combustible vapor or gas, which is passed off through the discharge-pipe $k'$, Fig. 2, to the burner-head G, which has a suitable air-inlet. The mixture of air and gas is forced through the ports or twyers $g'$, Fig. 1, into the top of fuel-chamber A, where it is ignited at the top of the fuel. A suitable emulsion-pump (not here shown) will be connected with the upper end of the generating-coil $j$ for generating a rich hydrocarbon gas for enriching the water-gas. The outlet end of coil $j$ connects by pipe $u$ with the fitting $t$ for conducting gas into the carbureting and fixing coil.

The carbureting and fixing coil $g$ is connected at the top by a supply-pipe $g^2$, leading from a fitting $t$, with which fitting there also connects the hydrocarbon-gas pipe $u$ and the water-gas pipe $q$ by branch pipe $l'$.

The discharge-pipe $q$ for water-gas connects with stack-pipe $A^3$ and with the downtake-pipe $q'$, which connects, by means of fitting $z'$, with the take-off pipe $y$ for conducting water-gas directly to a holder or to any place of immediate use. Pipe $q'$ is provided with a controlling-valve $w$. A branch pipe $l'$, having a valve $s$, connects the pipe $q$ with a fitting $t$ for passing part of the water-gas, when desired, through the carbureting and fixing coil $g$.

A smoke-stack pipe $A^3$ is provided with a valve-chamber $a^3$, which contains a conical or dish valve $m$, having attached thereto the wire rope or chain $n$, passing over pulleys $p\,p'$, for raising and lowering the valve.

Suitable sight-holes $e\,e$ are made in the walls of the furnace for observing the condition of the heat in the fuel-chamber and coil-chamber during the process of making gas.

The operation of making gas may be conducted as follows: The smoke-stack damper $m$ being opened, a fire is kindled on the grate with a quantity of oily waste, wood, or other suitable material and allowed to burn by natural draft until the generating-coils are sufficiently heated. An air-blast may be supplied to the fuel-chamber A through the twyers $g'$ at the top and peat or other suitable fuel fed in through the tight feeding device C. In order to heat the coils at the beginning of the operation, a fire may be kindled directly in the coil-chamber $A'$, if desired. For this purpose a door (not here shown) will be provided in the wall. A good fire having been kindled in the fuel-chamber A, such chamber is filled with solid carbonaceous fuel, which should be kept nearly up to the arch E, where the combustion takes place by the admission of air and gases or vapors through twyers $g'$, and the highly-heated products are forced down through the mass of fuel, heating it to incandescence. The hot products pass thence from the ash-pit up through the flues $a$ into the coil-chamber $A'$, where they heat the generating-coils to the proper temperature for generating gas and vapor from the emulsion of hydrocarbon oil and water. A body of incandescent fuel having been formed, the aqueous and volatile matter evolved from fresh charges of fuel at top of chamber A is continuously forced down through said body of incandescent fuel, wherein it is decomposed and converted into a fixed gas.

The coils having been suitably heated, an emulsion of oil and water is forced through the coils $k$, in which it is converted into a combustible vapor or gas which is forced through the discharge-pipe $k'$ into the burner-head G, into which is also admitted a supply of air, and the mixture is then discharged through the twyers $g'$ and burned at the top of fuel-chamber A. The products pass down through the incandescent fuel in chamber A through the grate and thence escape by the uptake-flues $a$ into the coil-chamber $A'$.

The gaseous products of combustion and the gaseous hydrocarbon vapors distilled from the fresh charges of fuel at the top of chamber A by passage down through the body of incandescent fuel are completely decomposed into fixed water-gas containing a small per cent. of nitrogen, but composed principally of carbonic oxid and hydrogen and substantially free from carbonic acid, ($CO_2$.) Since the water-gas contains no free oxygen or any oxidizing gas, there will be no external oxidation of the iron pipe composing the coil in chamber $A'$, and such pipe can therefore be heated to 2,500° or 3,000° Fahrenheit without a deleterious effect. The interior of the coil is protected from oxidation by the carbonaceous matter in the emulsion which is forced through it. The carbon in the emulsion when highly heated combines directly with the highly-heated oxygen as it is set free from the water, so that there is no free oxygen to attack the iron of the pipe.

The cleaned water-gas passing from the base of fuel-chamber A up through the flues $a$ will heat the coils to the desired temperature of 2,500° to 3,000° Fahrenheit. Suitable emulsions will be supplied to the coil $k$ and the coil $j$ by pumps, as heretofore described.

So soon as good water-gas is generated the stack-valve $m$ is closed and the gas is conducted off through pipes $q$, $q'$, and $y$ directly to a washer and holder. In case illuminating-gas is required a rich hydrocarbon gas may be generated in coil $j$ and forced out through pipe $u$, through connections $t$ and pipe $g^2$, into the carbureting and fixing coil $g$ and out through the lower end thereof through the pipe $z$, through fitting $z'$, as shown in dotted lines, into pipe $y$. The water-gas passing down through pipes $q\,q'$ into pipe $y$ will thus be carbureted by the rich hydrocarbon gas admitted through pipe $z$ into pipe $y$ and the two gases will be mingled and forced through a washer and thence into a holder. Instead of passing all of the water-gas down through pipe $q'$ a portion of it may be passed through the branch pipe $l'$ by opening its valve $s$ and forced by a jet of rich hydrocarbon gas from pipe $u$, through pipe $g^2$, into and through coil $g$, wherein it will become carbureted and fixed, and will then be discharged through pipes $z$ and $y$ to the washer and holder. This latter method of carbureting and fixing the water-gas is quite advantageous and a fixed high candle-power gas is produced.

Having described my invention, what I claim, and desire to secure by Letters Patent, is—

1. The process of making gas which consists in burning a combustible gas or vapor in contact with a body of carbonaceous fuel, thereby heating it to incandescence, and passing the resulting products through the incandescent fuel, producing water-gas, and, by means of such hot water-gas, heating generating-coils, and, at the same time, generating hydrocarbon gas by forcing water and hydrocarbon oil or carbonaceous material through said heated coil.

2. The process of making gas which consists in burning a combustible gas or vapor in contact with a body of carbonaceous fuel, thereby heating it to incandescence, and passing the resulting products through the incandescent fuel, producing water-gas, and, by means of such hot water-gas, heating generating-coils, and, at the same time, generating hydrocarbon gas by forcing water and hydrocarbon oil or carbonaceous material through said heated coil and mixing the resulting hydrocarbon gas with said water-gas for carbureting it.

3. The process of making gas which consists in producing a gas or gaseous vapor by forcing water and hydrocarbon oil or carbonaceous material into a heated conduit, then burning the resulting gas or vapor in contact with a body of fuel, thereby heating it to incandescence, and passing the products through the incandescent fuel, producing water-gas, and passing such highly-heated water-gas, in contact with said generating-coil for maintaining the heat thereof, whereby oxidation of the coil is prevented.

4. The process of making gas which consists in producing a gas or gaseous vapor by forcing water and hydrocarbon oil or carbonaceous material through a heated conduit or coil, burning the resulting vapors at the top of a body of fuel, thereby heating it to incandescence, and passing the resulting products down through the incandescent fuel for converting the aqueous vapors and other volatile matter from the fresher fuel into fixed water-gas, and passing such heated water-gas in contact with said generating-coil, for maintaining the heat thereof and preventing oxidation of the metal of the coil.

5. The process of making gas which consists in continuously burning gas or vapor containing a suitable proportion of hydrocarbon or carbonaceous material, in contact with a body of fuel, thereby heating it to incandescence, charging fresh fuel at suitable intervals on the top of said body of fuel, and passing the resulting products of combustion and the vapors from said fresh fuel down through the incandescent fuel to produce fixed water-gas.

6. The process of making gas which consists in burning a combustible gas or vapor in contact with a body of carbonaceous fuel, thereby heating it to incandescence, and continuously passing the resulting products through the incandescent fuel producing water-gas, and by means of such hot water-gas heating generating-coils, and, at the same time, generating hydrocarbon gas by forcing water and hydrocarbon oil or carbonaceous material through said heated coils, then passing the resulting hydrocarbon gas, together with water-gas, through a separate heated coil for producing a fixed gas.

7. The process of making gas which consists in burning a combustible gas or vapor in contact with a body of carbonaceous fuel, thereby heating it to incandescence, and passing the resulting products through the incandescent fuel, producing water-gas, and by means of such hot water-gas heating a generating-coil and a carbureting and fixing coil, and, at the same time, generating hydrocarbon gas by forcing water and hydrocarbon oil or carbonaceous material through said heated coils, and by means of a jet of the resulting gas or vapor forcing said water-gas into and through the second heated coil for carbureting and fixing the water-gas.

8. In a gas-generating apparatus, the combination with the fuel and water-gas-generating chamber, of a coil-chamber above the same and containing suitable generating-coils, flues connecting said fuel-chamber with the coil-chamber for conducting water-gas to heat the coils, a gas take-off pipe leading from said coil-chamber and a gas take-off pipe leading from the coils and connecting with the fuel-chamber for burning gas therein, substantially as described.

9. The fuel and water-gas-generating chamber having means for supplying air and combustible gases at the top thereof, in combination with a coil-chamber placed above said fuel-chamber, the two being separated by a horizontal partition, flues for water-gas leading from the base of the fuel-chamber into said coil-chamber, a set of generating-coils in said coil-chamber having a gas-outlet pipe, and a gas-outlet pipe leading from the coil-chamber for water-gas, substantially as described.

10. The combination with the fuel and water-gas-generating chamber having a burner-head and twyers at the top thereof, of a coil-chamber above the same, a generating-coil in said chamber having a supply-pipe for oil and water and a discharge-pipe connecting with said burner-head, flues connecting the fuel-chamber with the coil-chamber, a gas take-off pipe for water-gas leading from the coil-chamber, and a second set of coils for generating hydrocarbon gas and having a discharge-pipe connecting with said take-off pipe for water-gas.

11. The combination with the fuel-chamber and the coil-chamber above the same, connected by suitable flues for passage of water-gas, of a generating-coil for producing hydrocarbon gas, a separate carbureting and fixing coil, a take-off pipe for water-gas leading from the coil-chamber, and pipes connecting said generating-coil and the water-gas pipe with said carbureting and fixing coil, substantially as described.

In testimony whereof I affix my signature in presence of two witnesses.

WILLIAM FRANK BROWNE.

Witnesses:
E. B. CLARK,
H. E. PARKER.